Jan. 19, 1965 M. K. HAYNES 3,166,739

PARALLEL OR SERIAL MEMORY DEVICE

Filed May 18, 1960 2 Sheets-Sheet 1

INVENTOR.
MUNRO K. HAYNES
BY
Thomas & Crickenberger

Jan. 19, 1965 M. K. HAYNES 3,166,739

PARALLEL OR SERIAL MEMORY DEVICE

Filed May 18, 1960 2 Sheets-Sheet 2

3,166,739

PARALLEL OR SERIAL MEMORY DEVICE

Munro K. Haynes, Poughkeepsie, N.Y., assignor to International Business Machines Corporation, New York, N.Y., a corporation of New York Filed May 18, 1960, Ser. No. 30,010
6 Claims. (Cl. 340—173.1)

This invention relates to memory devices and more particularly to memory devices which permit parallel or serial types of operation.

In earlier known types of memory devices employing memory arrays the degree of flexibility in reading and writing has in many instances not measured up to heavy demands imposed for higher and higher rates of data flow in data processing systems, especially where economies in manufacture and repair are involved. In some instances the lack of flexibility in a memory device has required additional auxiliary equipment. The use of this auxiliary equipment involves an increase in costs and necessitates additional operating time which reduces the rate of data flow. In order to minimize some of the foregoing difficulties, this invention provides a memory array which receives information in parallel form, stores it and supplies it to utilization devices either in parallel form or in serial form as required.

It is a feature of this invention to provide a flexible memory device wherein information may be written in one or all or any combination of the registers of the memory device simultaneously.

Another feature of the invention is the provision of a memory device wherein information retained in the memory may be serially read out from any one or all or any combination of the registers in the memory device.

In accordance with a further feature of the invention, information may be read out in parallel from a selected one of the registers in the memory device, and the information in the selected register may be serially read out simultaneously with the parallel readout therefrom. Furthermore, while information is being simultaneously read out in parallel and serially from a selected register, information may be read serially from any one or all or any combination of all of the remaining registers.

According to another aspect of the invention a memory device is provided wherein information is written in parallel in any one or all or any combination of the remaining registers of the memory device. This affords a saving in time over the earlier memory devices which used one instant of time to read and a different instant of time to write.

A still further feature of the invention is the provision of a memory device wherein parallel writing operations may take place in any combination of registers and all remaining registers may simultaneously be read out serially.

The flexible memory device of this invention may take various forms. It is adaptable to numerous types of bistable devices. It is especially suitable for use with cryotrons and other cryogenic devices, and accordingly it is illustrated with the use of cryotrons. It is to be understood however that the invention is not to be limited to cryogenic devices or cryotrons in particular, since it is applicable to other types of bistable devices.

In one arrangement according to the invention a memory system is constructed from a plurality of registers forming the rows in an array configuration. Each register has a plurality of storage positions formed from superconductive persistent current loops. Corresponding storage positions in the registers make up the columns of the array configuration. Cryotron elements are utilized to control the information currents in the system, and the presence or absence of currents in the storage position loops provides indications of the binary information stored. Input and output circuits are coupled to the array to read information from the array or write information into the array in parallel sequence either simultaneously or asynchronously. Additional output circuits are provided for reading information serially from any one or more rows of the array either simultaneously or asynchronously. Various combinations of reading or of reading and writing may take place simultaneously thereby rendering the memory array highly flexible from an operational standpoint.

The foregoing and other features of this invention may be more fully appreciated when considered in the light of the following specification and the drawings in which.

Figures 1, 2, 3:
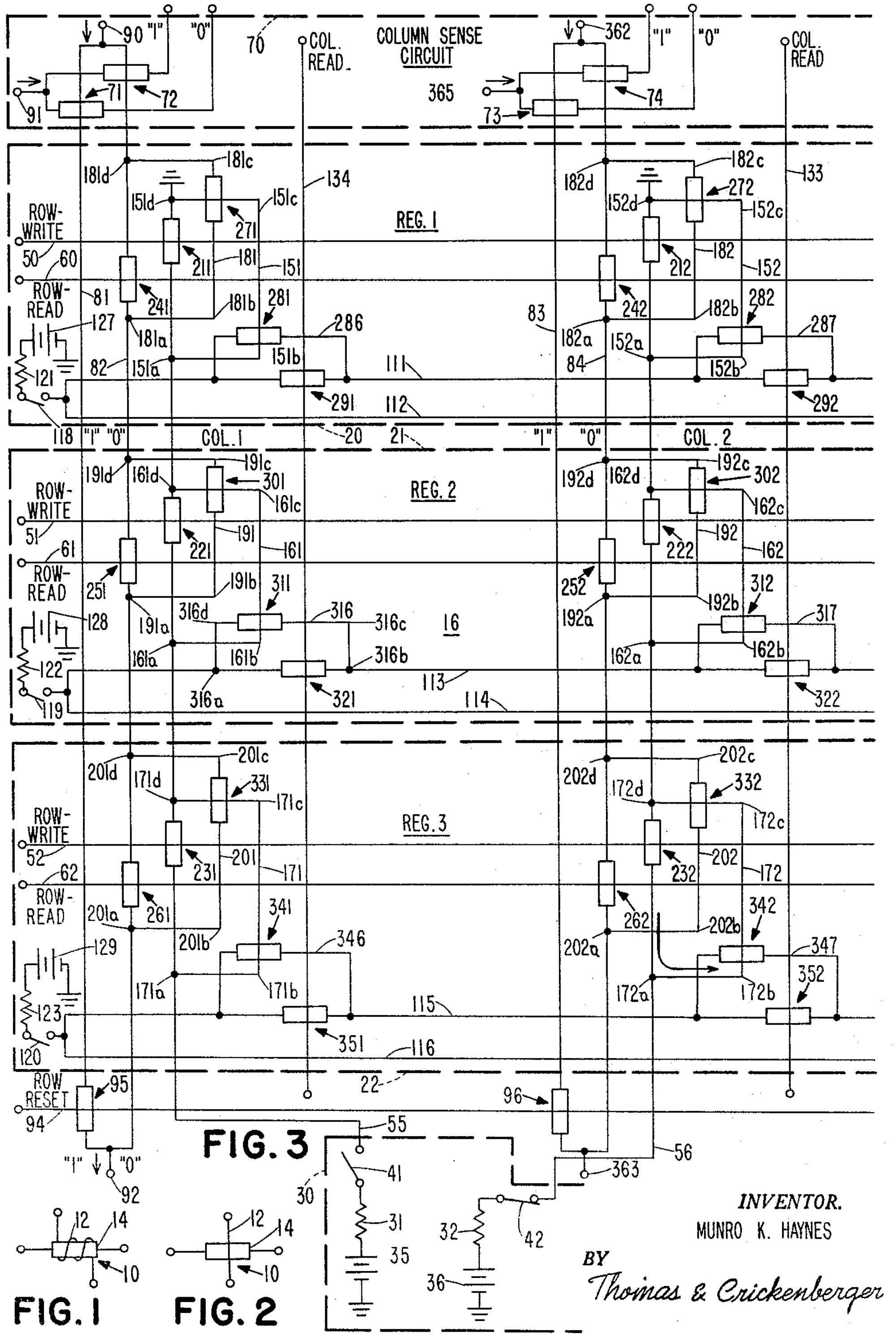
FIG. 1 illustrates a cryotron in schematic form.
FIG. 2 is a symbol employed throughout FIGS. 3 and 4 to represent the cryotron illustrated in FIG. 1.
FIGS. 3 and 4 illustrate a memory device constructed according to the principles of this invention.

Referring first to FIG. 1, a cryotron 10 is illustrated as having a winding 12 disposed about a gate element 14. While this cryotron is represented as a conventional wire-wound cryotron in the interest of providing a more graphic circuit illustration, it is to be understood that the cryotron may be constructed as thin film devices of the type such as those shown and described in copending application Serial No. 625,512 filed on November 30, 1956 by R. L. Garwin and assigned to the assignee of this invention. The circuit schematic of the cryotron 10 in FIG. 1 is depicted in FIG. 2 in a more simplified form. The same reference numerals employed in FIG. 1 are used in FIG. 2 to designate the corresponding parts. The winding 12 in FIG. 1 is represented in FIG. 2 by the vertical conductor 12 disposed across the gate element 14. The simplified legend of FIG. 2 is employed in FIGS. 3 and 4 to represent cryotron elements.

The circuits of this invention are operated at low temperatures such as by immersion in liquid helium, for example. The circuit lines or wires and the control coil of each cryotron are made of a hard superconductor, such as niobium, and the gate element of each cryotron is made of a soft superconductor, such as tantalum. The currents employed create a magnetic field in the control coil which exceeds the critical field of the gate, but the magnetic field does not exceed the critical field of the control coil or the connecting lines or wires. Accordingly, the gate element of the cryotron is driven resistive when there is current in the control coil, and the gate element is superconductive when there is no current in the control coil or when there is a current of magnitude less than the critical current in the control coil.

Figure 4:
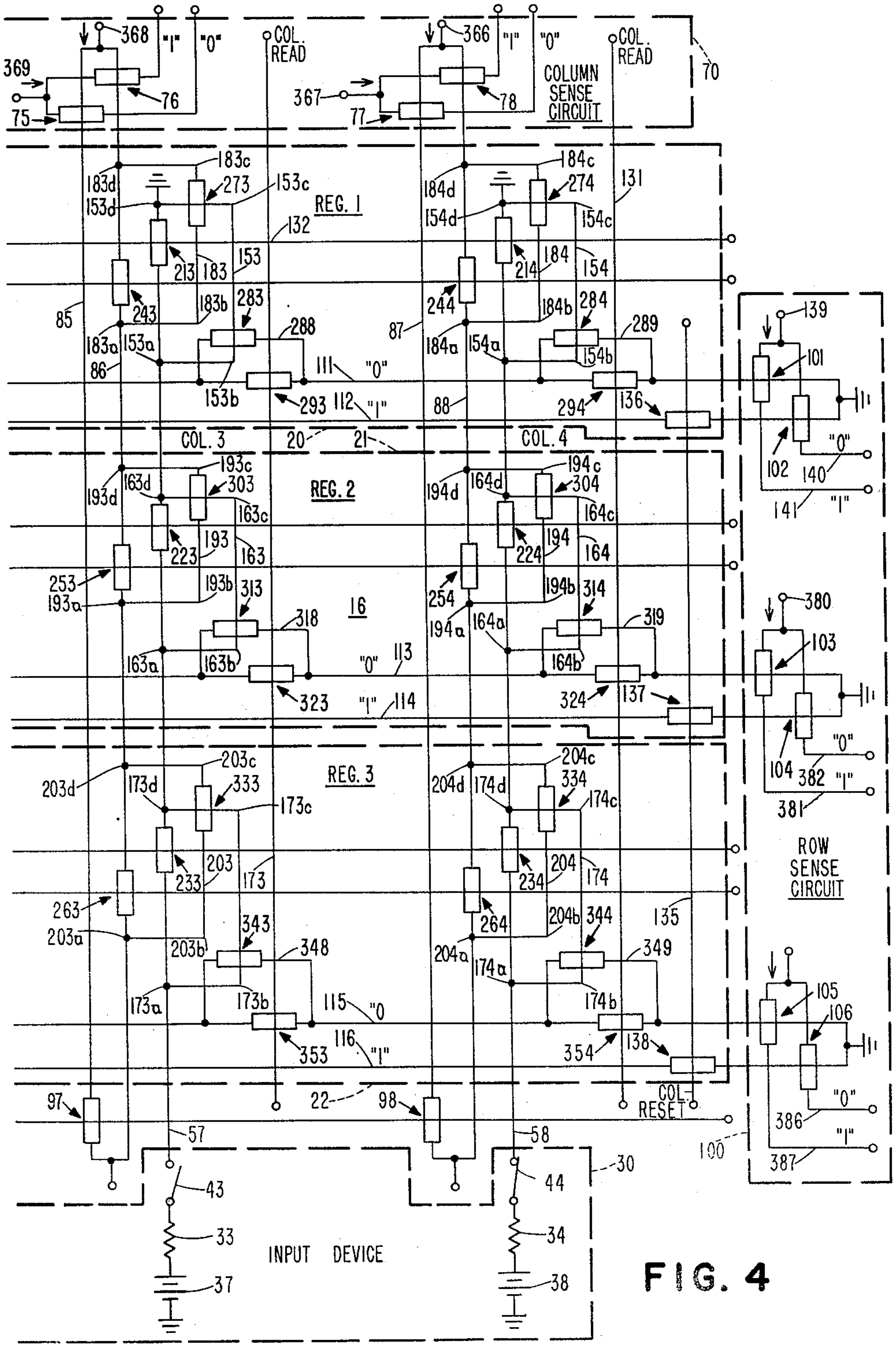

Referring next to FIGS. 3 and 4, an array 16 is shown as having registers 20, 21 and 22. It is to be understood that the array 16 may be changed in size by increasing or diminishing the number of registers or the number of storage positions in each register as desired. Information to be written into the array is supplied by an input device 30 which may take numerous forms. The input device 30 is illustrated as having resistors 31 through 34 connected in series with respective batteries 35 through 38 which serve as current sources. Switches 41 through 44 are connected to respective resistors 31 through 34. While the switches 41 through 44 are illustrated as mechanical switches, they may be electrical or electronic devices in practice.

For purposes of illustration it is arbitrarily assumed that an open switch represents a binary Zero and a closed switch represents a binary One. Accordingly, open switches 41 and 43 represent binary Zero, and closed switches 42 and 44 represent binary One. The switches 41 through 44 of the input device 30 are operated to represent binary information, and this information may be written into one or more registers of the array 16 by applying current to lines 50, 51 or 52. Information is to be written into register 1, the line 50 is energized with the current. If the information is to be written into registers 1 and 2, then lines 50 and 51 are both energized with current. If the information is to be written into registers 1, 2 and 3, then lines 50, 51 and 52 are each energized with current as signals representative of information are applied by the input device 30 to lines 55 through 58.

Information stored in the array 16 may be read therefrom in parallel through a column sense circuit 70 to a load device not shown. Registers 1, 2 and 3 may be read out in parallel by energizing respective lines 60, 61 or 62 with a current. For example, register 1 may be read out by energizing the line 60 with current. If register 1 is being read out in parallel to the column sense circuit 70, then register 2 or register 3 cannot be simultaneously read out in parallel to the column sense circuit 70.

The column sense circuit 70 includes cryotrons 71 through 78, and these cryotrons are controlled by current in respective lines 81 through 88. Cryotrons 71 and 72 are used to sense the presence of a current in the line 81 or the line 82. If current flows from a terminal 90 along the line 81, the gate element of the cryotron 71 is driven resistive, and a current from a terminal 91 is diverted from the resistive gate of the cryotron 71 through the superconductive gate of the cryotron 72 and out along the One output line. If current from the terminal 90 flows on the line 82, the gate of the cryotron 72 is driven resistive, and current from the terminal 91 is diverted by the resistive gate of the cryotron 72 through the superconductive gate of the cryotron 71 out along the Zero output line. The pair of cryotrons 73 and 74, the pair of cryotrons 75 and 76 and the pair of cryotrons 77 and 78 operate in the same fashion as the cryotrons 71 and 72.

Prior to a sense operation by the column sense circuit 70, a reset line 94 is energized with a current pulse, and this drives the gates of cryotrons 95 through 98 resistive. Thus current must flow in lines 82, 84, 86 and 88 and not in lines 81, 83, 85 and 87. It is seen therefore that the column sense circuit 70 is provided with a pair of cryotrons for each column of the array 16. For a parallel readout operation of a selective one of the registers 1, 2 or 3, the information passes in a column-wise fashion through the column sense circuit 70 to a utilization device not illustrated.

A row sense circuit 100 is employed to read information serially from register 1, register 2 or register 3 in any desired combination. The row sense circuit 100 includes cryotrons 101 through 106, and these cryotrons are controlled by current in respective lines 111 through 116. These lines are disposed in pairs, and each pair of lines is connected to a source of current through respective switches 118 through 120. The switches 118 through 120 are connected through respective resistors 121 through 123 to associated batteries 127 through 129 which serve as current sources. While the switches 118 through 120 are illustrated as mechanical switches, it is pointed out they may be electrical or electronic devices if desired.

To read out register 1 serially, the switch 118 is closed and vertical lines 131 through 134 are sequentially pulsed. The information in register 1 may be serially read out from right to left by pulsing the lines 131 through 134 in that order. If the information in register 1 is to be serially read out from left to right, then the lines 131 through 134 are sequentially pulsed in the reverse order. That is, line 134 is pulsed first, then line 133, followed by lines 132 and 131. Assuming that the information in register 1 is to be read out from right to left, the vertical line 131 is pulsed first. Prior to pulsing the line 131, a reset line 135 is pulsed, and this drives the gates of cryotrons 136 through 138 resistive. Current from the battery 121 is accordingly diverted from the line 112, if current is flowing in the line, to the line 111. The vertical line 131 is pulsed with a current to read the rightmost position of register 1. If current continues to flow in the line 111 after the line 131 has been pulsed, a binary Zero is indicated. If current is diverted to the line 112 when the line 131 is pulsed, a binary One is indicated. Whenever, current flows in line 111, the gate of the cryotron 101 is driven resistive, and current from a terminal 139 is diverted from the resistive gate of the cryotron 101 to the superconductive gate of the cryotron 102 out along the Zero output line. If current flows on the line 112, it drives the gate of the cryotron 102 resistive, and current from the terminal 139 is diverted by the resistive gate of the cryotron 102 to the superconductive gate of the cryotron 101 out along the One output conductor.

In order to read the second position from the right of register 1, the switch 118 remains closed, the reset line 135 is energized with the current pulse, and after the pulse on the reset line 135 is terminated, the vertical line 132 is pulsed with a current. The information held in the second position from the right of register 1 is presented on output lines 140 and 141 to a utilization device not illustrated. In order to read the third position from the right of register 1, the reset line 135 is again pulsed, and subsequently the line 133 is pulsed. Similarly, the reset line 135 is pulsed again, and subsequently the line 134 is pulsed to read the leftmost position of register 1.

Accordingly, it is seen that information in register 1 may be read out in serial fashion from right to left, and this information presented through the row sense circuit 100 to a utilization device associated with output lines 140 and 141. Registers 2 and 3 may be read out in like fashion through the row sense circuit 100. It is pointed out that while a selected one of the registers 1 through 3 may be read out serially, any combination of the registers 1 through 3, including all of these registers together, may be read out simultaneously through the row sense circuit 100 to a utilization device. Furthermore, as any one or more of the registers 1 through 3 is being read out serially, a selective one of these registers may simultaneously be read out in parallel through the column sense circuit 70 to another utilization device.

Registers 1 through 3 of the array 16 include four storage positions in each register. Register 1 has four storage positions defined by storage loops 151 through 154. The storage loop 151 is defined by the points 151*a*, 151*b*, 151*c*, and 151*d*. Storage loops 152 through 154 of register 1 are correspondingly defined by the points *a*, *b*, *c* and *d* associated with these numbers. Register 2 has its storage positions defined by storage loops 161 through 164 with each of these storage loops being defined by the points *a*, *b*, *c* and *d* associated with these numbers. Likewise, the register 3 has four storage positions defined by the loops 171 through 174 with each loop being defined by the points *a*, *b*, *c* and *d* associated with the loop number.

The matrix 16 in FIGS. 3 and 4 has corresponding storage positions of each register serially connected in vertical columns. Information in the form of signals on the line 55 may be stored in any one of the loops 151, 161 and 171 connected in series in column 1. Information in the form of signals on the line 56 may be stored in any one of the loops 152, 162 and 172 connected in series in column 2. Information in the form of signals on the line 57 may be stored in any one of the loops 153, 163 and 173 connected in series in column 3. In like fashion information in the form of signals on the line 58 may be stored in any one of the loops 154, 164 and 174 connected in series in column 4.

Each one of the storage loops 151 through 154 of register 1 has a respective one of the sense loops 181 through 184 associated therewith. The sense loop 181 is defined by the points *a*, *b*, *c* and *d* associated with the number 181. In like fashion, the sense loops 182, 183 and 184 are defined by the letters *a*, *b*, *c* and *d* associated with these numbers. Register 2 has sense loops 191 through 194 associated with respective storage loops 161 through 164. The sense loops 191 through 194 are defined by the letters *a, b, c* and *d* associated with the sense loop number. Register 3 has sense loops 201 through 204 associated with respective storage loops 171 through 174. These sense loops are defined by the letters *a, b, c* and *d* associated with the number of the sense loop.

Whenever a writing operation takes place in any one or more of the registers 1 through 3, a respective one of the lines 50, 51 and 52 is energized. When the line 50 is energized, the gates of the cryotrons 211 through 214 are driven resistive. This prevents currents from flowing between the points *a* and *b* in the storage loops 151 through 154. Any current which flows in these loops must flow in the path *a, b, c* and *d* of these loops, and current flow in such paths is indicative of the binary One condition. In case no current is supplied to the loops 151 through 154, the resistive condition of the gates of the cryotrons 211 through 214 dissipates any persistent current which may have been present. The absence of a current in any one of the loops 151 through 154 represents the binary Zero condition. The register 2 is operated in like fashion whenever the line 51 is energized. If the line 51 is energized, the gates of the cryotrons 221 through 224 are driven resistive. Register 3 is operated in like manner when a current is applied to the line 52, and a current on this line drives the gates of the cryotrons 231 through 234 resistive to effect the operation explained with respect to register 1.

Whenever a parallel readout operation takes place from registers 1, 2 or 3, a respective one of the lines 60, 61 or 62 is energized with a current. If the line 60 is energized with a current, the gates of the cryotrons 241 through 244 are driven resistive. If the line 61 is energized with a current, the gates of the cryotrons 251 through 254 are driven resistive. If the line 62 is energized with the current, the gates of the cryotrons 261 through 264 are driven resistive.

When information in register 1 is read out in parallel to the column sense circuits 70, the storage loops 151 through 154 control respective cryotrons 271 through 274 which are disposed in respective sense loops 181 through 184. Whenever register 1 is read out serially through the row sense circuit 100, the storage loops 151 through 154 control respective cryotrons 281 through 284 which are disposed in respective sense loops 286 through 289. The sense loops 286 through 289 include corresponding cryotrons 291 through 294 which are controlled by current in respective lines 134, 133, 132 and 131.

When register 2 is read out in parallel through the column sense circuit 70, the storage loops 161 through 164 control respective cryotrons 301 through 304 which are disposed in respective sense loops 191 through 194. When register 2 is read out serially through the row sense circuit 100, the storage loops 161 through 164 control respective cryotrons 311 through 314 which are disposed in respective sense loops 316 through 319. Each of the sense loops 316 through 319 includes a respective one of the cryotrons 321 through 324 which are controlled by current in a respective one of the lines 134, 133, 132 and 131.

When register 3 is read out in parallel through the column sense circuit 70, the storage loops 171 through 174 control respective cryotrons 331 through 334 which are disposed in respective sense loops 201 through 204. When register 3 is read out serially through the row sense circuit 100, the storage loops 171 through 174 control respective cryotrons 341 through 344 which are disposed in respective sense loops 346 through 349. The sense loops 346 through 349 includes a respective one of the cryotrons 351 through 354, and these cryotrons are controlled by current in respective lines 134, 133, 132 and 131.

In order to illustrate how words are written in parallel in one or more of the registers 1 through 3 of the array 16 in FIGS. 3 and 4, let it be assumed that the binary word 0101 is to be written in register 3. The switches 41 through 44 of the input device 30 are disposed as illustrated in FIGS. 3 and 4. The switch 41 is open to represent a binary Zero, and no current flows on the line 55. The switch 42 is closed to represent a binary One, and current follows on the line 56. The switch 43 is open to represent a binary Zero, and no current flows on the line 57. The switch 44 is closed to represent a binary One, and current flows on the line 58.

During the period these switches are thus operated, a current is applied to the write line 52. This drives the gates of the cryotrons 231 through 234 resistive. The storage loop 171 in column 1 of register 3 receives no current from the battery 35, and the resistive state of the gate of the cryotron 231 dissipates any persistent current which may have been present in the storage loop 171. In like fashion, the resistive condition of the gate of the cryotron 233 in column 3 of resister 3 dissipates any persistent current which may have been present in the storage loop 173. Accordingly, the storage loops 171 and 173 of register 3 receive no current from the respective batteries 35 and 37, and upon termination of the pulse on the write line 52, these storage circuits hold no persistent current. The absence of a persistent current in each of these loops represents a binary Zero. The storage loop 172 in column 2 of register 3 receives current from the battery 36. The resistive condition of the gate of the cryotron 232 causes the current from the battery to be diverted from the point 172*a* to the point 172*b*, then to the point 172*c* and then to the point 172*d* and onward to the loop 162 of register 2 and then through the loop 152 of register 1 to ground which is the opposite side of the battery.

In like fashion current from the battery 38 flows to the point 174*a* of the storage loop 174, then to the point 174*b*, then to the point 174*c*, then to the point 174*d* and through the loops 164 of register 2 and the loop 154 of register 1 to ground. The write pulse on the write line 52 is terminated, and current from the battery 36 continues to flow in the loop 172 from the point 172*a*, 172*b*, 172*c* and 172*d*, then out through the loops 162 and 152 to ground even though the gate of the cryotron 232 in the loop 172 is now superconductive. In a like manner the current from the battery 38 continues to flow in the loop 174 from the point 174*a* to 174*b* to 174*c* to 174*d* and out through the loops 164 and 154 to ground even though the gate of the crytron 234 in the loop 174 is now superconductive.

At this point, all of the switches 41 through 44 are opened. Since the switches 41 and 43 were already open, they remain open and the opening of the switches 42 and 44 prevents the flow of current from respective batteries 36 and 38 along respective lines 56 and 58. Current in that portion of the loop 172 defined by the points 172*a*, 172*b*, 172*c* and 172*d* commences to circulate in the closed superconductive path of the loop 172 defined by the points 172*a*, 172*b*, 172*c*, 172*d* and 172*a*. This persistent current represents a binary One in the storage loop 172, and the persistent current creates a magnetic field on the gates of the cryotrons 332 and 342 which exceeds the critical magnetic field of these gates. Thus the gates of the cryotrons 332 and 342 are driven resistive. The critical field of the gate of the cryotron 232 is not exceeded by the magnetic field produced by the persistent current in the loop 172, and this gate remains superconductive. In like fashion, a persistent current is established in the loop 174 which drives the gates of the cryotrons 334 and 344 resistive, but the gate of the cryotron 234 remains superconductive. The persistent current in the loop 174 represents a binary One. It is seen therefore that the binary word 0101 is stored in respective columns 1 through 4 of register 3.

If it is desired to write the same binary word 0101 in register 2, the foregoing sequence of events is repeated except the write line 51 is energized with a current instead of the write line 52. In case it is desired to write this word in register 1, then the write line is energized with a current and the write lines 51 and 52 are not energized with a current. The same binary word may be written in all registers of the arrays 16 in FIGS. 3 and 4 by repeating the parallel write operation described above and energizing each of the write lines 50, 51 and 52 with a current simultaneously. In such instance the binary word 0101 is written in columns 1 through 4 of all registers 1 through 3. Accordingly, it is seen that for a parallel write operation a given word supplied by the input device 30 may be written in one or more of the registers 1 through 3 or in any combination of the registers 1 through 3.

The switches 41 through 44 of the input device 30 are left open except when signals representative of information are supplied by the input device 30 to the array 16 for a parallel write operation. It is pointed out however that the switches 41 through 44 may remain closed for the purpose of writing information into any one or more registers without disturbing the information held in the remaining registers of the array 16 in FIGS. 3 and 4. To illustrate this, let it be assumed that the binary word 0101 is stored in register 3 in columns 1 through 4 respectively, and that it is desired to write the binary word 1110 in respective columns 1 through 4 of register 2. In order to write the binary word 1110 in register 2, the switches 41 through 44 of the input device 30 are operated so that switches 41, 42 and 43 are closed and the switch 44 is open. The write line 51 is energized with a current, and the binary word 1110 is written in register 2 in a manner similar to that explained above.

During this parallel write operation current must be supplied from the battery 35 in column 1 through a portion of the storage loop 171 of register 3 to the storage loop 161 in register 2 and then out through a portion of the loop 151 in register 1 to ground which is the opposite side of the battery. Since the storage loop 171 represents a binary Zero, it must not develop a persistent current as a result of the parallel write operation in column 1 of register 2. It is pointed out therefore that current from the battery 35 flows through that portion of the storage loop 171 from the point 171*a* through the superconductive gate of the cryotron 231 to the point 171*d* and then to the storage loop 161 of register 2. The amount of current flowing in that portion of the inductive loop 171 between the points 171*a* and 171*d* is relatively small compared to that flowing in the portion of the loop 171 defined by the points 171*a*, 171*b*, 171*c* and 171*d*. Accordingly, when current from the battery 35 is terminated by opening the switch 41, there is no persistent current established in the loop 171, and storage loop 171 is considered to represent a binary Zero. Accordingly, the Zero state or condition represented by the storage lop 171 in column 1 of register 3 is effectively not disturbed by the writing operation in the storage loop 161 in column 1 of register 2. Likewise, the writing of a One in the storage loop 163 in column 3 of register 2 does not effectively disturb the binary Zero state or condition of the loop 173 of column 3 in register 3. In column 4 the writing of a Zero in the storage loop 164 of register 2 does not affect the persistent current stored in the storage loop 174 of register 3, representing the binary One state because the switch 44 is open and no current is supplied on the line 58. Thus, the Zero state is established in the storage loop 164 of register 2 when the current on the line 51 drives the gate of the cryotron 224 resisitive, thereby dissipating any persistent current which previously might have been stored in the loop 164.

The writing of a One in the storage loop 162 of register 2 requires that a current from the battery 36 pass through the storage loop 172 in register 3. The storage loop 172 has a persistent current which may be considered to circulate in the direction indicated by the arrow 360 disposed within this loop. The storage loop 172 is inductive, and in practice the portion of the loop 172*a* to 172*d* is made to have far less inductance in comparison to that portion of this loop denoted by the points 172*a*, 172*b*, 172*c* and 172*d*. Since the current from the battery 36 divides inversely in proportion to the inductive reactance of the two parallel paths 172*a*, 172*d* and 172*a*, 172*c*, 172*d*, it follows that most of the current from the battery 36 flows through the path 172*a*, 172*d* and a small portion of the current flows through the path 172*a*, 172*b*, 172*c*, 172*d*. Since the persistent current in the leg 172*d*, 172*a* of the storage loop 172 opposes that portion of the current from the battery therethrough, there is effectively no current flowing in that leg of the loop 172*a*, 172*d*; whereas, the current flowing in the leg 172*a*, 172*b*, 172*c* and 172*d* of the loop 172 includes the persistent current and a small portion of the current from the battery 36 which are aiding each other. The total current in the loop 172*a*, 172*b*, 172*c*, 172*d* is equal to the battery current. Thus, the current flowing from the point 172*d* toward the storage loop 162 is equal to the battery current, most of which flows in the leg 172*a*, 172*b*, 172*c*, 172*d* and a small portion of which flows in the leg 172*a*, 172*d* with the two combining at the point 172*d* to reconstitute the battery current as it is supplied to the storage loop 162 of register 2. The battery current supplied to the loop 162 is diverted by the resistive gate of the cryotron 222 through the leg 162*a*, 162*b*, 162*c*, 162*d*.

When the write pulse on the line 51 terminates, the battery current continues to flow in the leg 162*a*, 162*b*, 162*c*, 162*d* even though the path 162*a*, 162*d* is superconductive. This is because a current once established in either of two superconductive parallel paths continues in that path so long as both paths remain superconductive. When the switch 42 is opened and current no longer flows on the line 56, a persistent current is established in the storage loop 162 by the electrical energy stored in the inductance of that portion of the loop 162 defined by the points 162*a*, 162*b*, 162*c* and 162*d*. As soon as the battery current ceases to flow to the storage loop 172 in column 2 of register 3, the persistent current, previously stored in this loop, is re-established by the electrical energy stored in the inductance of that portion of the loop 172 defined by the points 172*a*, 172*b*, 172*c* and 172*d*. It is seen, therefore, that the writing of a One in the storage loop 162 does not effectively disturb the storage loop 172, and the gates of the cryotrons 332 and 342 remained resistive throughout the parallel write operation. Thus, the sense loops 347 and 202 may have been employed for reading operations during the above described parallel write operation.

A selected one of the registers 1 through 3 of the array 16 in FIGS. 3 and 4 may be read out in parallel through the column sense circuit 70 to a utilization device not illustrated. In order to illustrate a parallel read out operation, let it be assumed that register 1 is selected. The reset line 94 is pulsed with a current, and the gates of the cryotrons 95 through 98 are driven resistive. Any current flowing in the vertical lines 81, 83, 85 or 87 is thereupon diverted from these lines and is caused to flow in a respective one of the associated vertical lines 82, 84, 86 or 88. Once the reset pulse on the line 94 is terminated, the selected read line 60 may be pulsed. A current pulse on this line drives the gates of the cryotrons 241 through 244 resistive, and currents flowing into the points 181*d*, 182*d*, 183*d* and 184*d* are diverted by the resistive gates of the cryotrons 241 to 244 through the respective superconductive gates of the cryotrons 271 to 274 which are disposed in the sense loops 181 through 184, respectively. At this point let it be further assumed that the binary word 0101 is stored in respective columns 1 through 4 of register 1. Accordingly, current diverted by the resistive gate 241 in the sense loop 181 of column 1 flows from the points 181*d* to the point 181*c*, then through the superconductive gate of the cryotron 271 to the point 181*d*, then to the point 181*a* and out along the conductor 82 and ultimately to the exit terminal 92. Current in the line 82 from the input terminal 90 drives the gate of the cryotron 72 in the column sense circuit 90 to its resistive state, thereby diverting current from the terminal 91 through the superconductive gate of the cryotron 71 and out along the Zero output conductor of the sense circuit associated with column 1. It is seen therefore that a Zero is read from column 1 of register 1. In like fashion, it is readily seen that a Zero is read from column 3 of register 1.

In columns 2 and 4 of register 1 persistent currents are stored in the loops 152 and 154. Accordingly, the gates of the cryotrons 272 and 274 are driven resistive by the persistent currents in the respective storage loops 152 and 154. Considering first column 2 of register 1, current from the input terminal 362 finds the gates of the cryotrons 242 and 272 in the sense loop 182 in their resistive state, and hence the current from the terminal 362 is diverted from the line 84 to the line 83, and ultimately reaches the exit terminal 363. Current from a terminal 365 in the column sense circuit 70 is diverted by the resistive gate of the cryotron 73 to the superconductive gate of the cryotron 74, and it flows out along the one output line of column 2. Thus, it is seen that a One is read from column 2 of register 1. In column 4 of register 1 the persistent current in the storage loop 154 drives the gate of the cryotron 274 resistive. Since the gate of the cryotron 244 is driven resistive by the read pulse on the line 60, current from an input terminal 366 is diverted from the line 88 to the line 87. As a consequence, current from an input terminal 367 is diverted from the resistive gate of the cryotron 77 to the superconductive gate of the cryotron 78, and it flows out along the one output line of column 4. Accordingly, a One is read from column 4 of register 1.

The read pulse on the line 60 may be terminated as soon as the persistent currents in the storage loops 152 and 154 have switched the currents from the lines 84 and 88 to respective lines 83 and 87. The output signals from the column sense circuit continue to represent the binary word 0101 in respective columns 1 through 4 as long as current is applied to the terminals 91, 365, 367 and 369. Current to these terminals may be in the form of pulses, or it may be a D.C. signal whichever is required by the utilization device. It is seen, therefore, that the binary word 0101 is read from respective columns 1 through 4 of register 1 by a parallel readout operation.

If it is desired to read out register 2 in parallel to the column sense circuit 70, the reset line 94 is pulsed with the current and subsequently the read line 61 is pulsed with the current. The column sense circuit provides output signals from each column representative of the binary information held in register 2. If register 3 is selected for a parallel readout operation, the row sense circuit 94 is pulsed, and upon termination of this pulse the read line 62 is pulsed. The information held in columns 1 through 4 of register 3 is presented as output signals from the column sense circuit 70. Only one of the registers 1 through 3 may be read out in parallel at any one instant of time.

Any one of the registers 1 through 3 may be read out through the row sense circuit 100, or any combination of the registers 1 through 3 simultaneously may be read out serially through the row sense circuit 100. In order to illustrate how a serial readout operation is performed, let it be assumed that the binary word 0101 is stored in register 2 and that register 2 is selected for a serial readout operation. The switch 119 associated with register 2 is closed. Then the reset line 135 is energized with a current pulse. The energization of the line 135 drives the gates of the cryotrons 136, 137 and 138 resistive. The resistive gate of the cryotron 137 diverts the current from the battery 128 from the line 114 to the line 113. Current from the battery 128 flows to the sense loop 316 in column 1 of register 2. Since the storage loop 161 in column 1 of register 2 holds a Zero, the gate of the cryotrons 311 is superconductive, and since the line 134 carries no current at this instant, the gate of the cryotron 321 is superconductive. Accordingly, current flowing to the sense loop 316 from the battery 128 divides inversely in proportion to the inductance of the two parallel legs of the loop 316 one leg of which is defined by the points 316*a* and 316*b*, and the other leg of which is defined by the points 316*a*, 316*b*, 316*c* and 316*d*. The magnitude of the current through the superconductive gate of the cryotron 321 is less than the critical current of this gate. A portion of the current from the battery 128 also flows in the leg 316*a*, 316*d*, 316*c* and 316*b*. The total current leaving the sense loop 316 is equal to the battery current. This current flows along the line 113 to the sense loop 317.

Since the storage loop 162 in column 2 of register 2 holds a binary One, a persistent current is circulating in this loop, and it drives the gate of the cryotron 312 resistive. Thus, all of the battery current flowing to the loop 317 is diverted by the resistive gate of the cryotron 312 to the superconductive gate of the cryotron 322. The battery current flowing to the sense loop 318 in column 3 of register 2 divides between the cryotrons 313 and 323 in the same manner as it did in the sense loop 316 of column 1 of register 2. The battery current flowing to the sense loop 319 in column 4 finds the gate of the cryotron 314 resistive because a persistent current is stored in the storage loop 164. Consequently, all of the battery current flows through the superconductive gate of the cryotron 324 in the sense loop 319. From the sense loop 319 the current flows to ground which is the other side of the battery 128. Thus it is seen that the effect of pulsing the reset line 135 is to divert the current from the battery 128 from the line 114, in case it is flowing in this line, to the line 113 and cause the current to divide, or not divide, in the various sense loops 316 through 319 as explained above. At this point, serial readout operations may take place. The serial readout may commence with column 4 and progress through to column 1, or it may commence with column 1 and progress through to column 4, or it may commence with any column and progress in any order. Let it be assumed arbitrarily that the serial readout is to commence with column 4 and progress sequentially through to column 1. Accordingly, a pulse is applied to the line 131 which drives the gates of the cryotrons 294, 324 and 354 resistive. At this instant, the gates of the cryotrons 314 and 324 in the sense loop 319 in column 4 of register 2 are both resistive, and current from the battery 128 is diverted from the line 113 to the line 114. Current in the line 114 drives the gate of the cryotron 104 resistive and diverts the current from the terminal 380 to the superconductive gate of the cryotron 103. This current flows out on the one output line 381 from the row sense circuit 100. This completes the end of the first serial transfer operation, and the One stored in column 4 of register 2 is read out.

Before the second serial readout operation can take place the reset line 135 must be pulsed again to divert current in the line 114 to the line 113. Next, the vertical line 132 is pulsed, and this drives the gate of the cryotron 323 resistive. Since the storage loop 163 in column 3 of register 2 holds a Zero, the gate of the cryotron 313 remains superconductive. Accordingly, the current from the battery 128 is diverted by the resistive gate of the cryotron 323 through the superconductive gate of the cryotron 313, and this current continues on the line 113 until ultimately it reaches ground or the opposite side of the battery 128. Current in the line 113 drives the gate of the cryotron 103 resistive and diverts current from the terminal 380 to a superconductive gate of the cryotron 104. This current flows out along the Zero output line 382 from the row sense circuit 100. At this point the second serial readout operation is completed, and the Zero stored in column 3 of register 2 is readout.

Before the third readout operation can take place, the reset line 135 is again pulsed, and current is diverted from the line 114 to the line 113. Next, the line 133 is pulsed with a current, and this drive the gate of the cryotron 322 resistive. The storage loop 162 in column 3 of register 2 holds a persistent current which drives the gate of the cryotron 312 resistive. Since both of the cryotrons 312 and 322 are resistive, current from the battery 128 is diverted from the line 113 to the line 114. Current in the line 114 drives the gate of the cryotron 104 resistive, and this diverts current from the terminal 380 to the superconductive gate of the cryotron 103. The current then flows out along the one output line 381 of the row sense circuit 100. The third serial readout operation is completed, and a One is read from column 2 of register 2.

In preparation for reading out column 1 of register 2, the reset line 135 is pulsed again, and the current in the line 114 is diverted to the line 113. Next, the line 134 is pulsed, and this drives the gate of the cryotron 321 in the sense loop 316 resistive. Since the storage loop 161 in column of register 2 holds a Zero, the gate of the cryotron 311 remains superconductive, and current from the battery 128 is diverted by the resistive gate of the cryotron 321 through the superconductive gate of the cryotron 311. The current which leaves the sense loop 316 flows along the line 113 and drives the gate of the cryotron 103 resistive. The current from the terminal 380 is thereby diverted to the superconductive gate of the cryotron 104, and it flows out along the Zero output line 382 from the row sense circuit 100. This is the end of the fourth serial readout operation, and a Zero is read from column 1 of register 2. It is seen therefore that the binary word 0101 stored in columns 1 through 4 of register 2 is read out on the output conductors 381 and 382 of the row sense circuit 100 with the readout taking place serially commencing with column 4 progressing sequentially through column 3, then column 2 and then column 1.

In view of the foregoing explanation of how register 2 may be read out serially through the row sense circuit 100, it is readily seen how register 1 or register 3 may be read out in like fashion by pulsing the line 131 through 134 sequentially, always pulsing the reset line 135 before pulsing each of the lines 131 through 134. Information serially read from the register 1 passes from the row sense circuit 100 on output lines 140 or 141. Information serially read from register 3 passes through the row sense circuit 100 on output lines 386 or 387. Furthermore, it is permissible to perform a parallel write operation in one or more registers, and from the remaining registers there may take place simultaneously a parallel readout operation from a selected one of these registers with a serial readout from any one or any combination of these remaining registers.

From the foregoing illustrations concerning parallel writing, parallel readout and serial readout, it is readily seen that various combinations of these operations may take place simultaneously. It is permissible for instance to readout in parallel a selected register and to write in parallel in all remaining registers. On the other hand it is permissible to write in in parallel in one or more registers and simultaneously to read out serially all remaining registers. Alternatively, it is permissible to read out in parallel from a selected register and simultaneously to read out serially one or all of any combination of the registers. It is to be understood that the number of registers as well as the number of storage positions in the registers may be increased or decreased as desired. By increasing the number of registers and the number of storage positions in each register a large quantity of data may be handled with a high degree of flexibility. The flexibility afforded by the various types of simultaneous parallel write, parallel readout and serial readout is more pronounced as the number of registers is increased.

What is claimed is:

1. A memory array having storage units disposed in columns and rows, means coupled to the array to write information in parallel in different storage units disposed along any row of the array, means coupled to the array to read information in parallel from any given storage unit disposed along any row of the array to output means external of the array, and means coupled to the array to read information serially from any combination of the rows of the array simultaneously with parallel write operations in any combination of the remaining rows.

2. A memory system having a plurality of registers, means coupled to the registers to write in parallel in different registers at the same time, means coupled to the registers to read information in parallel from any given register to output means external of the registers, and means coupled to the registers to read serially any register not involved with a parallel write operation asynchronously with parallel write operations.

3. A memory device having a plurality of registers, means coupled to the registers to write information in parallel in each register, means coupled to the registers to read simultaneously information in parallel from any given register not involved in a parallel write operation, to output means external of the registers, and means coupled to the registers to read simultaneously information serially from any register not involved with a parallel write operation.

4. A memory system having a plurality of registers, first means coupled to the registers to write in parallel in any two registers simultaneously, second means coupled to the plurality of registers to read in parallel to output means external of the registers from a selected one of the plurality of registers, and third means coupled to the plurality of registers to read serially from any combination of the plurality of registers.

5. A memory system having a plurality of registers, first means coupled to the registers to write in parallel in any two registers simultaneously, second means coupled to the plurality of registers to read in parallel from a selected one of the plurality of registers to output means external of the registers, and third means operated asynchronously with the second means coupled to the plurality of registers to read serially from any combination of the plurality of registers, operations performed by the first, second and third means being accomplished co-extensively.

6. A memory system having a plurality of registers, first means coupled to the registers to write in parallel in any two registers simultaneously, second means coupled to the plurality of registers to read in parallel from a selected one of the plurality of registers to output means external of the registers, and third means operated simultaneously with the second means coupled to the plurality of registers to read serially from any combination of the plurality of registers, the second and third means operating on the same registers which registers are different from those operated on by the first means.

References Cited in the file of this patent

UNITED STATES PATENTS

| | | |
|---|---|---|
| 2,635,229 | Gloess | Apr. 14, 1953 |
| 2,691,155 | Rosenberg | Oct. 5, 1954 |
| 2,734,187 | Rajchman | Feb. 7, 1956 |
| 2,803,812 | Rajchman | Aug. 20, 1957 |
| 2,802,203 | Stuart-Williams | Aug. 6, 1957 |
| 2,958,075 | Torrey | Oct. 25, 1960 |
| 3,114,137 | Morgan | Dec. 10, 1963 |